United States Patent
Capo

(12) United States Patent (10) Patent No.: US 11,486,688 B1
Capo (45) Date of Patent: Nov. 1, 2022

(54) LEVEL-CORRECTING GAUGE BLOCK

(71) Applicant: Leo Capo, Verona, NJ (US)

(72) Inventor: Leo Capo, Verona, NJ (US)

(*) Notice: Subject to any disclaimer, the term of this patent is extended or adjusted under 35 U.S.C. 154(b) by 0 days.

(21) Appl. No.: 17/195,957

(22) Filed: Mar. 9, 2021

Related U.S. Application Data

(60) Provisional application No. 63/198,185, filed on Oct. 1, 2020.

(51) Int. Cl.
*G01B 3/30* (2006.01)

(52) U.S. Cl.
CPC ..................... *G01B 3/30* (2013.01)

(58) Field of Classification Search
CPC ......................................... G01B 3/30
See application file for complete search history.

(56) References Cited

U.S. PATENT DOCUMENTS

| | | | |
|---|---|---|---|
| 697,701 A | 4/1902 | Ayer | |
| 802,402 A | 10/1905 | Martin | |
| 2,114,936 A * | 4/1938 | Pilnick | G01B 3/40 |
| | | | D10/64 |
| 2,536,401 A | 1/1951 | Victor | |
| 2,846,772 A | 8/1958 | Strausser | |
| 5,199,180 A * | 4/1993 | Yablonsky | G01B 3/30 |
| | | | D10/64 |
| 5,604,989 A * | 2/1997 | Stevenson | G01B 3/46 |
| | | | 33/506 |
| D411,808 S * | 7/1999 | Irwin | D10/65 |
| 6,813,842 B2 * | 11/2004 | Wang | G01B 3/30 |
| | | | 33/534 |
| 6,862,815 B1 | 3/2005 | Blouch | |
| 7,591,073 B1 * | 9/2009 | Eckles | G01B 3/30 |
| | | | 33/562 |
| 9,097,506 B2 * | 8/2015 | Shapiro | G01B 3/04 |
| 9,683,826 B2 | 6/2017 | Cupertino | |
| 10,046,456 B2 | 8/2018 | Byrt | |
| 10,612,902 B2 * | 4/2020 | Granville | G01B 3/04 |
| 11,009,333 B1 * | 5/2021 | Zamora | G01B 3/56 |
| 2007/0234483 A1 * | 10/2007 | Kunz | B25D 1/00 |
| | | | 7/150 |
| 2013/0125407 A1 * | 5/2013 | Shapiro | G01B 3/04 |
| | | | 33/484 |
| 2018/0319009 A1 * | 11/2018 | Byrt | G01B 3/30 |

FOREIGN PATENT DOCUMENTS

WO 2017120665 7/2017

* cited by examiner

*Primary Examiner* — Yaritza Guadalupe-McCall
(74) *Attorney, Agent, or Firm* — Kyle A. Fletcher, Esq.

(57) ABSTRACT

The level correcting gauge block is a tool. The level correcting gauge block incorporates a stepped structure, a level tool, and a target surface. The level tool is a tool used to identify a plane that is perpendicular to the force of gravity (called a horizontal plane). The level tool is used to determine whether the target surface is parallel (or "level") to a plane that is perpendicular to the force of gravity. The stepped structure works in conjunction with the level tool. The stepped structure measures the elevation change required to be made to the target surface to bring the target surface to level.

13 Claims, 3 Drawing Sheets

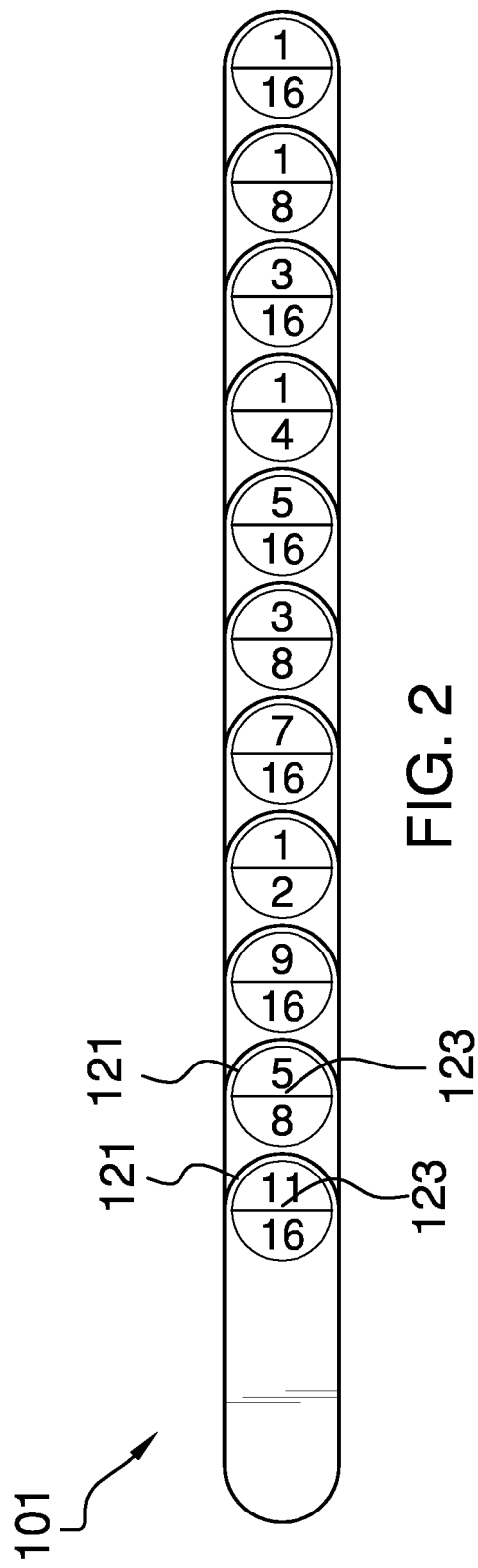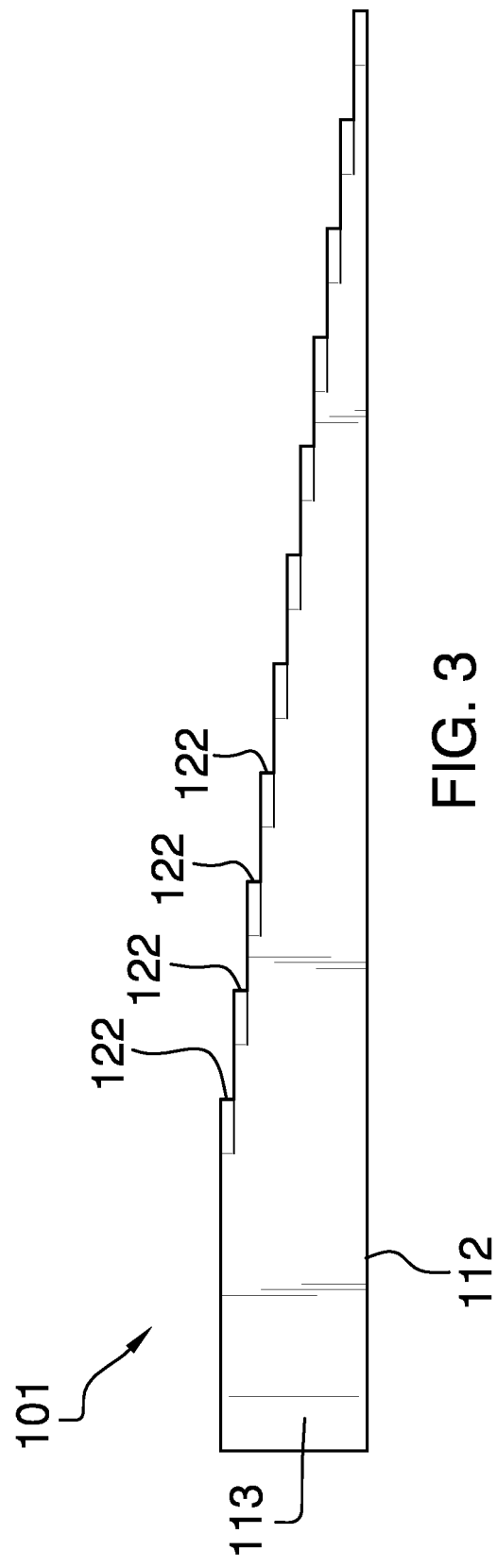

LEVEL-CORRECTING GAUGE BLOCK

CROSS REFERENCES TO RELATED APPLICATIONS

This non-provisional application claims priority under 35 USC 119(e) to United States provisional application U.S. 63/198,185 filed on Oct. 10, 2020 by the inventor: Leo Capo of Hashbrouck Heights N.J. This non-provisional application claims United States provisional application U.S. 62/179,837 in its entirety.

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of measuring arrangements using mechanical means, more specifically, a method for measuring a clearance between spaced objects. (G01B5/14)

SUMMARY OF INVENTION

The level correcting gauge block is a tool. The level correcting gauge block comprises a stepped structure, a level tool, and a target surface. The level tool is a tool used to identify a plane that is perpendicular to the force of gravity (called a horizontal plane). The level tool is used to determine whether the target surface is parallel (or "level") to a plane that is perpendicular to the force of gravity. The stepped structure works in conjunction with the level tool. The stepped structure measures the elevation change required to be made to the target surface to bring the target surface to level.

These together with additional objects, features and advantages of the level correcting gauge block will be readily apparent to those of ordinary skill in the art upon reading the following detailed description of the presently preferred, but nonetheless illustrative, embodiments when taken in conjunction with the accompanying drawings.

In this respect, before explaining the current embodiments of the level correcting gauge block in detail, it is to be understood that the level correcting gauge block is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the level correcting gauge block.

It is therefore important that the claims be regarded as including such equivalent construction insofar as they do not depart from the spirit and scope of the level correcting gauge block. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 2 is a top view of an embodiment of the disclosure.

FIG. 3 is a side view of an embodiment of the disclosure.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
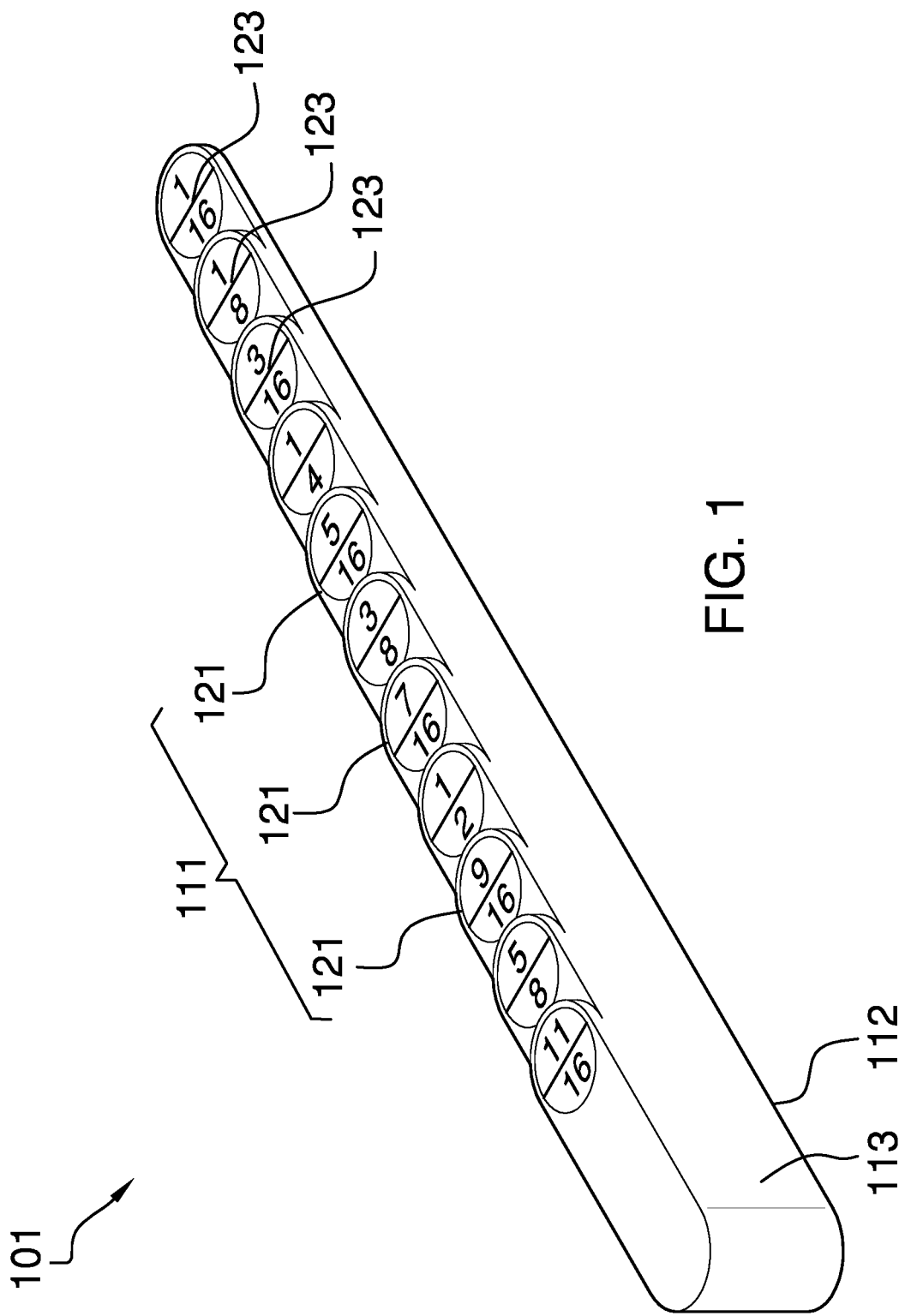
FIG. 1 is a perspective view of an embodiment of the disclosure.
Figure 4:
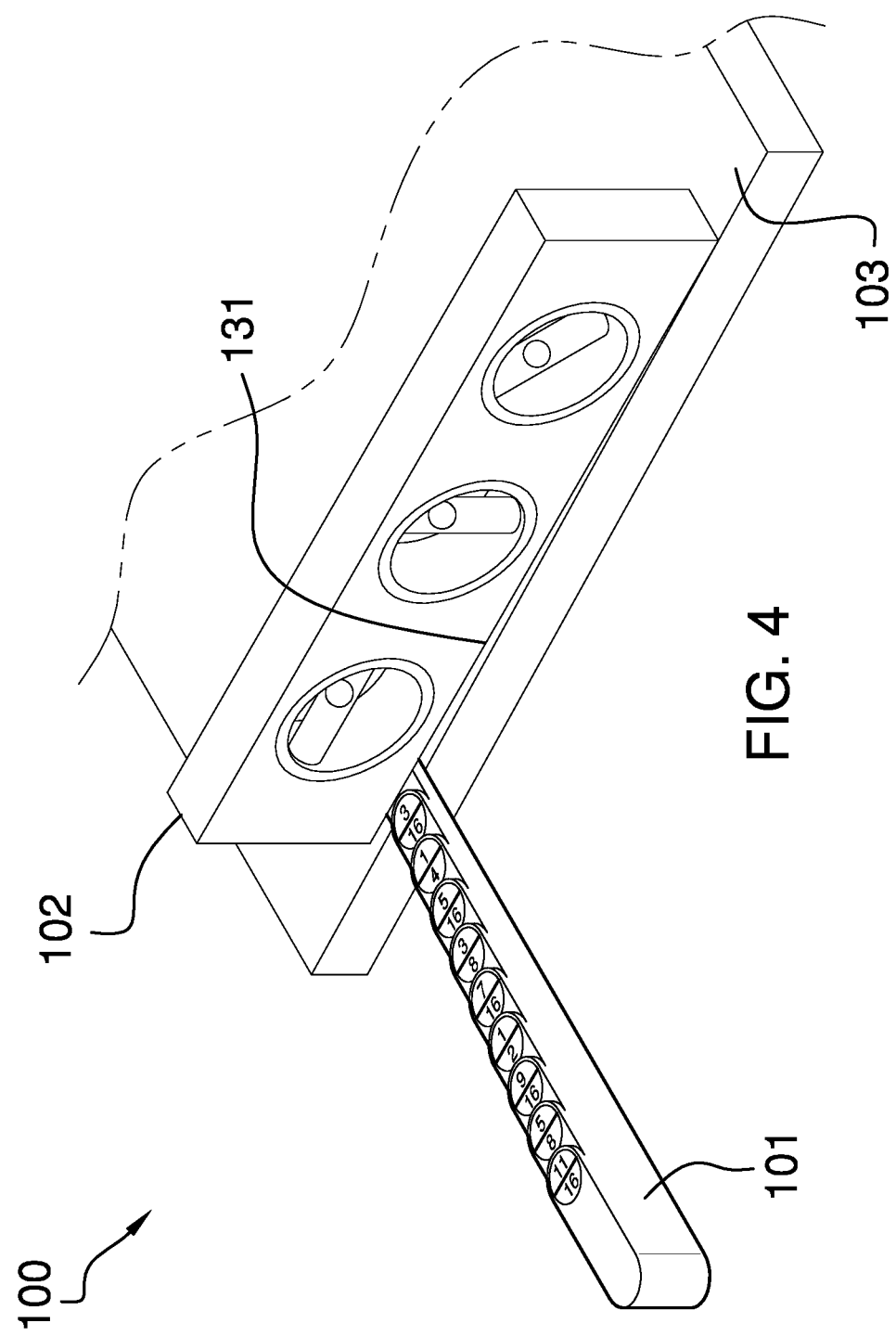
FIG. 4 is an in-use view of an embodiment of the disclosure.

Detailed reference will now be made to one or more potential embodiments of the disclosure, which are illustrated in FIGS. 1 through 4.

The level correcting gauge block 100 (hereinafter invention) is a tool. The invention 100 comprises a stepped structure 101, a level tool 102, and a target surface 103. The level tool 102 is a tool used to identify a plane that is perpendicular to the force of gravity (called a horizontal plane). The level tool 102 is used to determine whether the target surface 103 is parallel (or "level") to a plane that is perpendicular to the force of gravity. The stepped structure 101 works in conjunction with the level tool 102. The stepped structure 101 measures the elevation change required to be made to the target surface 103 to bring the target surface 103 to level.

The target surface 103 is a Euclidean surface that is intended to be horizontally oriented. The level tool 102 is formed with a Euclidean alignment surface 131 that would fully align with and sit flush on the target surface 103 when the target surface 103 is aligned with the plane that is perpendicular to the force of gravity.

The level tool 102 is a tool. The level tool 102 forms a structure that maintains a constant reference relative to the force of gravity that is invariant to the orientation of the level tool 102. The level tool 102 uses the constant reference relative to the force of gravity to confirm that the target surface 103 is aligned with a plane that is perpendicular to the force of gravity. The level tool 102 further comprises an alignment surface 131.

The stepped structure 101 measures the span of the distance between the target surface 103 and the plane that is perpendicular to the force of gravity when the alignment surface 131 of the level tool 102 is aligned with the plane that is perpendicular to the force of gravity. The alignment surface 131 of the level tool 102 visibly shows a space that is formed by a cant between the target surface 103 and the plane that is perpendicular to the force of gravity when the target surface 103 is not properly aligned with the plane that is perpendicular to the force of gravity. The stepped structure 101 inserts into the space between the target surface 103 and the alignment surface 131 of the level tool 102 to measure the span of the distance between the target surface 103 and the plane that is perpendicular to the force of gravity.

The individual calibrated pad 121 selected from the plurality of calibrated pads 111 that inserts into the space between the alignment surface 131 and the target surface 103 with the minimum clearance indicates the measure of the span of the distance between the alignment surface 131 and the target surface 103. The individual calibrated pad 121 and the plurality of calibrated pads 111 are described elsewhere in this disclosure.

The stepped structure 101 is a mechanical structure. The stepped structure 101 is a calibrated structure. The stepped structure 101 is defined elsewhere in this disclosure. The stepped structure 101 inserts into a space formed between the level tool 102 and the target surface 103 when the level tool 102 is aligned with the plane that is perpendicular to the force of gravity. The stepped structure 101 inserts into the space formed between the level tool 102 and the target surface 103 in the manner of a shim. The stepped structure 101 is calibrated such that the stepped structure 101 measures the elevation change to the target surface 103 that is required to bring the target surface 103 into alignment with the plane that is perpendicular to the force of gravity. The stepped structure 101 comprises a plurality of calibrated pads 111, a reference face 112, and a lateral face 113.

The lateral face 113 forms a pedestal structure that elevates the plurality of calibrated pads 111 relative to the reference face 112. The lateral face 113 form the sides of the structures.

The reference face 112 is a Euclidean surface that forms the base reference for the elevation of each of the plurality of calibrated pads 111. The reference face 112 forms the surface of the stepped structure 101 that is distal from the plurality of calibrated pads 111. The reference face 112 sits flush on the target surface 103 during the use of the invention 100. The reference face 112 remains flush on the target surface 103 as the stepped structure 101 inserts into the space between the target surface 103 and the alignment surface 131 of the level tool 102.

The plurality of calibrated pads 111 forms the plurality of steps that are characteristic of the stepped structure 101. Each of the plurality of calibrated pads 111 forms a platform. The surface of each of the plurality of calibrated pads 111 is parallel to the reference face 112 of the stepped structure 101. The elevation of any first individual calibrated pad 121 selected from the plurality of calibrated pads 111 differs from the elevation of any second individual calibrated pad 121 selected from the plurality of calibrated pads 111.

By the elevation of any individual calibrated pad 121 is meant that the measure of the span of the distance from the reference face 112 of the stepped structure 101 that is measured along a line that: a) projects perpendicularly away from the reference face 112; b) that passes through the center of the selected individual calibrated pad 121; and, c) that is measured at the point where the perpendicular line passes through the exterior surface of the selected individual calibrated pad 121.

The plurality of calibrated pads 111 comprises a collection of individual calibrated pads 121. The individual calibrated pad 121 is a disk-shaped structure. Each of the individual calibrated pad 121 attaches to the surface of the stepped structure 101 that is distal from the reference face 112. Each of the individual calibrated pad 121 forms a step of the stepped structure 101. The individual calibrated pad 121 comprises a horizontally oriented structure 122 and a calibration indicia 123.

The horizontally oriented structure 122 is a disk-shaped structure. The horizontally oriented structure 122 of each individual calibrated pad 121 marks a calibrated elevation that can be used to measure the space between the target surface 103 and the alignment surface 131. The faces of the disk structure of the horizontally oriented structure 122 is parallel to the reference face 112 of the stepped structure 101.

The calibration indicia 123 is an image that is marked on the exterior surface of the horizontally oriented structure 122. The calibration indicia 123 is an indicia that presents a sentiment that indicates the measured elevation of the horizontally oriented structure 122 of the individual calibrated pad 121.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Calibration: As used in this disclosure, a calibration refers to a standard scale that is marked on an instrument and that is used for measurement. In its verbal form, to calibrate refers to comparing an instrument's calibration against a known and trusted standard to ensure that the calibration of the instrument remains correct.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Euclidean Surface: As used in this disclosure, a Euclidean surface refers to a two-dimensional plane that is formed without a curvature. By without a curvature is meant that the shortest distance between any two points on a Euclidean surface forms a line that remains on the Euclidean surface.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Level: As used in this disclosure, a level is a tool used to identify a plane that is perpendicular to the force of gravity. The level is a transparent cylindrical structure that contains a liquid phase media and a gas phase media. The plane that is perpendicular to the force of gravity is identified by the position of the gas phase media within the liquid phase media.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Major and Minor Axes: As used in this disclosure, the major and minor axes refer to a pair of perpendicular axes that are defined within a structure. The length of the major axis is always greater than or equal to the length of the minor axis. The major axis is always the longest diameter of the structure. The major and minor axes intersect at the center of the structure. The major axis is always parallel to the longest edge of a rectangular structure.

Negative Space: As used in this disclosure, negative space is a method of defining an object through the use of open or empty space as the definition of the object itself, or, through the use of open or empty space to describe the boundaries of an object.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan is are open.

Pedestal: As used in this disclosure, a pedestal is an intermediary load bearing structure that forms a load path between two objects or structures.

Perimeter: As used in this disclosure, a perimeter is one or more curved or straight lines that bounds an enclosed area on a plane or surface. The perimeter of a circle is commonly referred to as a circumference.

Platform: As used in this disclosure, a platform is a raised horizontal surface that forms a load path to support objects placed on the superior surface of the platform.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Roughly: As used in this disclosure, roughly refers to a comparison between two objects. Roughly means that the difference between one or more parameters of the two compared objects are not significantly different.

Scale: As used in this disclosure, refers to a visual system of ordered markings that are used as a reference for measurement.

Shim: As used in this disclosure, a shim is a physical structure that is used to align a first object with a second object or a plane.

Step: As used in this disclosure, a step is a horizontally oriented platform on which an object rests to increase or decrease its elevation.

Stepped Structure: As used in this disclosure, a stepped structure is a structure formed from a plurality of steps. Each of the plurality of steps forms a horizontally oriented platform. The elevation of the platform of any first step contained in the plurality of steps is different from the elevation of the platform of any second step contained in the plurality of steps. The plurality of steps are sequenced such that the vertical elevation of any two adjacent steps selected from the plurality of steps always increases for ascending the stepped structure (or equivalently always decreases for descending the stepped structure).

Such As: As used in this disclosure, the term "such as" is a conjunction that relates a first phrase to a subsequent phrase. The term "such as" is used to introduce representative examples of structures that meet the requirements of the first phrase. As a first example of the use of the term "such as," the phrase: "the first textile attaches to the second textile using a fastener such as a hook and loop fastener" is taken to mean that a hook and loop fastener is suitable to use as the fastener but is not meant to exclude the use of a zipper or a sewn seam. As a second example of the use of the term "such as," the phrase: "the chemical substance is a halogen such as chlorine or bromine" is taken to mean that either chlorine or bromine are suitable for use as the halogen but is not meant to exclude the use of fluorine or iodine.

Such That: As used in this disclosure, the term "such that" is a conjunction that relates a first phrase to a subsequent phrase. The term "such that" is used to place a further limitation or requirement to the first phrase. As a first example of the use of the term "such that," the phrase: "the door attaches to the wall such that the door rotates relative to the wall" requires that the attachment of the door allows for this rotation. As a second example of the use of the term "such that," the phrase: "the chemical substance is selected such that the chemical substance is soluble in water" requires that the selected chemical substance is soluble in water. As a third example of the use of the term "such that," the phrase: "the lamp circuit is constructed such that the lamp circuit illuminates when the lamp circuit detects darkness" requires that the lamp circuit: a) detect the darkness; and, b) generate the illumination when the darkness is detected.

Superior: As used in this disclosure, the term superior refers to a directional reference that is parallel to and in the opposite direction of the force of gravity when an object is positioned or used normally.

Taper: As used in this disclosure, a taper is a continuous and typically, but not necessarily gradual, change in the span of the length of a structure in the direction parallel a direction selected from the group selected from the major axis and the minor axis of the structure. The change in the span of the length occurs as an apparent function of the measurement position along the unselected axis of the object.

Tapered Prism Structure: As used in this disclosure, a tapered prism structure is a modified prism structure that is formed such that the first congruent end of the modified prism structure is geometrically similar to, but not geometrically identical to the second congruent end of the modified prism. The span of length of a radial line from the center axis to the lateral face of the modified prism structure will vary as a function of its position along the center axis.

Tool: As used in this disclosure, a tool is a device, an apparatus, or an instrument that is used to carry out an activity, operation, or procedure.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Working Element: As used in this disclosure, the working element of a tool is the physical element on the tool that performs the actual activity, operation, or procedure the tool is designed to perform. For example, the cutting edge of a blade is the working element of a knife.

With respect to the above description, it is to be realized that the optimum dimensional relationship for the various components of the invention described above and in FIGS. 1 through 4 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A level correcting gauge block comprising
a stepped structure, a level tool, and a target surface;
wherein the level tool is a tool that identifies a plane that is perpendicular to the force of gravity;
wherein the level tool determines whether the target surface is parallel ("level") to the plane that is perpendicular to the force of gravity;
wherein the stepped structure works in conjunction with the level tool;
wherein the stepped structure measures the elevation change required to be made to the target surface to bring the target surface to level;
wherein the stepped structure comprises a plurality of calibrated pads, a reference face, and a lateral face;
wherein the lateral face forms a pedestal structure that elevates the plurality of calibrated pads relative to the reference face;

wherein the reference face is a Euclidean surface that forms the base reference for the elevation of each of the plurality of calibrated pads wherein the plurality of calibrated pads comprises a collection of individual calibrated pads;

wherein the individual calibrated pad is a disk-shaped structure;

wherein each of the individual calibrated pad attaches to the surface of the stepped structure that is distal from the reference face;

wherein the individual calibrated pad comprises a horizontally oriented structure and a calibration indicia;

wherein the horizontally oriented structure is a disk-shaped structure;

wherein the horizontally oriented structure of each individual calibrated pad marks a calibrated elevation that can be used to measure the space between the target surface and the alignment surface;

wherein the faces of the disk structure of the horizontally oriented structure are parallel to the reference face of the stepped structure;

wherein the calibration indicia is an image that is marked on the exterior surface of the horizontally oriented structure;

wherein the calibration indicia is an indicia that presents a sentiment that indicates the measured elevation of the horizontally oriented structure of the individual calibrated pad.

2. The level correcting gauge block according to claim 1 wherein the target surface is a Euclidean surface.

3. The level correcting gauge block according to claim 2 wherein the level tool is a tool;

wherein the level tool forms a structure that maintains a constant reference relative to the force of gravity that is invariant to the orientation of the level tool;

wherein the level tool uses the constant reference relative to the force of gravity to confirm that the target surface is aligned with a plane that is perpendicular to the force of gravity.

4. The level correcting gauge block according to claim 3 wherein the level tool further comprises an alignment surface;

wherein the alignment surface is a Euclidean surface;

wherein alignment surface aligns with and sits flush on the target surface when the target surface is aligned with the plane that is perpendicular to the force of gravity.

5. The level correcting gauge block according to claim 4 wherein the alignment surface of the level tool visibly shows a space that is formed by a cant between the target surface and the plane that is perpendicular to the force of gravity when the target surface is not aligned with the plane that is perpendicular to the force of gravity.

6. The level correcting gauge block according to claim 5 wherein the stepped structure measures the span of the distance between the target surface and the plane that is perpendicular to the force of gravity when the alignment surface of the level tool is aligned with the plane that is perpendicular to the force of gravity.

7. The level correcting gauge block according to claim 6 wherein the stepped structure inserts into the space between the target surface and the alignment surface of the level tool to measure the span of the distance between the target surface and the plane that is perpendicular to the force of gravity.

8. The level correcting gauge block according to claim 7 wherein the stepped structure is a mechanical structure;

wherein the stepped structure is a calibrated structure;

wherein the stepped structure inserts into the space formed between the level tool and the target surface in the manner of a shim.

9. The level correcting gauge block according to claim 8 wherein the stepped structure is calibrated such that the stepped structure measures the elevation change to the target surface that is required to bring the target surface into alignment with the plane that is perpendicular to the force of gravity.

10. The level correcting gauge block according to claim 9 wherein the reference face forms the surface of the stepped structure that is distal from the plurality of calibrated pads;

wherein the reference face sits flush on the target surface during the use of the level correcting gauge block;

wherein the reference face remains flush on the target surface as the stepped structure inserts into the space between the target surface and the alignment surface of the level tool.

11. The level correcting gauge block according to claim 10 wherein each of the plurality of calibrated pads forms a platform;

wherein the surface of each of the plurality of calibrated pads is parallel to the reference face of the stepped structure.

12. The level correcting gauge block according to claim 11 wherein the elevation of any first individual calibrated pad selected from the plurality of calibrated pads differs from the elevation of any second individual calibrated pad selected from the plurality of calibrated pads;

wherein by the elevation of any individual calibrated pad is meant that the measure of the span of the distance from the reference face of the stepped structure that is measured along a line that: a) projects perpendicularly away from the reference face; b) that passes through the center of the selected individual calibrated pad; and, c) that is measured at the point where the perpendicular line passes through the exterior surface of the selected individual calibrated pad.

13. The level correcting gauge block according to claim 12 wherein each individual calibrated pad selected from the plurality of calibrated pads that inserts into the space between the alignment surface and the target surface with the minimum clearance indicates the measure of the span of the distance between the alignment surface and the target surface.

* * * * *